United States Patent [19]

Kivi et al.

[11] Patent Number: 4,955,970
[45] Date of Patent: Sep. 11, 1990

[54] METHOD OF FORMING A JOINT BETWEEN A CONNECTING PIECE AND A PRODUCT FORMED OF COMPOSITE MATERIAL, SAID JOINT, AND SAID CONNECTING PIECE FOR FORMING SAID JOINT

[75] Inventors: Ilkka Kivi, Helsinki; Tapio Manner, Vantaa; Kari Kuvaja; Jorma Terävä, both of Tampere, all of Finland

[73] Assignees: Exel Oy; Rauma-Repola Oy, both of Finland

[21] Appl. No.: 257,435

[22] Filed: Oct. 13, 1988

[30] Foreign Application Priority Data

Oct. 16, 1987 [FI] Finland .................................. 874576

[51] Int. Cl.⁵ .............................................. F16L 39/00
[52] U.S. Cl. ................................... 285/149; 285/239; 285/423; 156/172
[58] Field of Search ................... 285/239, 423, 149; 156/172; 249/175, 83; 425/111, 122; 403/291, 343

[56] References Cited

U.S. PATENT DOCUMENTS

| | | | |
|---|---|---|---|
| 1,166,059 | 12/1915 | Ledbetter | 285/239 |
| 1,847,218 | 3/1932 | Lamb | 285/149 |
| 2,479,828 | 8/1949 | Geckler | 156/172 X |
| 3,613,736 | 10/1971 | Kuwabara | 285/149 X |
| 3,765,979 | 10/1973 | Thomas | 285/423 X |
| 3,989,280 | 11/1976 | Schwarz | 285/239 X |
| 4,065,339 | 12/1977 | Lippert et al. | 285/423 |
| 4,148,342 | 4/1979 | Welsby | 285/239 X |
| 4,428,602 | 1/1984 | Lambot et al. | 285/239 |
| 4,506,918 | 3/1985 | Friedrich et al. | 285/156 |
| 4,549,919 | 10/1985 | Auberon et al. | 285/239 X |
| 4,802,404 | 2/1989 | Dirkin et al. | 285/149 X |

FOREIGN PATENT DOCUMENTS 7710500 3/1978 Netherlands .................... 285/149

*Primary Examiner*—Dave W. Arola
*Attorney, Agent, or Firm*—Steinberg & Raskin

[57] ABSTRACT

A method for forming a joint between a product formed of composite material including reinforcing fibers and a connecting piece includes forming the connecting piece with a shoulder within a joint region thereof and during the formation of the product, guiding the longitudinally extending reinforcing fibers of the composite material as continuous, unitary fibers through a first path within the joint region of the connecting piece toward the connecting piece shoulder, around the shoulder of the connecting piece, and then in a substantially opposite direction through a second path within the joint region of the connecting piece to return to the composite material of the product, whereby both the product of composite material and the joint between the product and the connecting piece are formed simultaneously.

8 Claims, 1 Drawing Sheet

METHOD OF FORMING A JOINT BETWEEN A CONNECTING PIECE AND A PRODUCT FORMED OF COMPOSITE MATERIAL, SAID JOINT, AND SAID CONNECTING PIECE FOR FORMING SAID JOINT

BACKGROUND OF THE INVENTION

This invention relates to arrangements by which connecting pieces are fixed to products of composite material to form a joint between them.

Generally, composite material is referred to herein as a combination of a binding material matrix and reinforcing fiber material extending through the matrix. For example, the binding material matrix can comprise epoxy or polyester resins, or certain thermoplastic materials. The reinforcing fiber materials can, for example, comprise fiberglass or fibers of carbon, polyetheylene, etc.

A typical application for the present invention is in connection with pipes manufactured of composite material of the type used in offshore installations. Such pipes are of relatively low weight and are therefore particularly suited to replace conventional metallic pipes typically formed of stainless steel. A problem, however, in replacing metallic pipes with pipes formed of composite material is in the technique by which the pipes are joined to each other. More particularly, where the connection between two pipes is subject to high tensile strains, conventional technology does not provide an adequate solution.

The most commonly used technique for joining two products formed of composite material is by gluing. Gluing, however, has the drawback of providing insufficient shear strength.

Another conventional technique for joining two composite material products is a mechanical joint of the type described, for example, in U.S. Pat. No. 4,549,919. However, such mechanical joints require an additional connecting piece which increases the size and weight of the joint which is undesireable.

A third conventional technique used in joining a pair of products of composite material comprises a superposed lamination. A drawback of this technique, however, is that an additional manufacturing step is required which involves an increased amount of work. Further, the strength of the connection is relatively low due to the reduced area of the joint. Moreover, formation of such a connection requires additional composite material.

SUMMARY OF THE INVENTION

The object of the present invention is to provide a new and improved joint between a product formed of composite material and a connecting piece for use in connecting the product to another product formed of composite material which is not subject to the drawbacks of conventional arrangements.

Briefly, in accordance with the present invention, this object, as well as others, are obtained by providing a method for forming a joint comprising the steps of forming the connecting piece of a shoulder within a joint region thereof and that during formation of the product, longitudinally extending reinforcing fibers of the composite material are guided as continuous, unitary fibers in a first path within the joint region in a first direction toward the connecting piece shoulder, around the shoulder of the connecting piece, and in a substantially opposite direction over a second path within the joint region of the connecting piece to return to the composite material of the product, whereby both the composite material product and the joint which it forms with the connecting piece are formed simultaneously.

In an illustrated preferred embodiment of the invention, the reinforcing fiber is guided within the joint region of the connecting piece so that it intersects itself at least once in the joint region whereby a self-tightening joint between the product and the connecting piece is obtained.

Another feature of an illustrated embodiment is that the reinforcing fiber is guided such that it turns around the shoulder of the connecting piece one or more times prior to being guided in the opposite direction through the second path.

Further, in an illustrated preferred embodiment, an uninterrupted, continuous fiber is used as the reinforcing fiber whereby joints are formed simultaneously at both ends of the product.

In accordance with still another feature of a preferred embodiment, the connecting piece has a substantially conical portion defining a cone angle while the path of the reinforcing fiber within the joint region of the connecting piece defines a turning angle with respect to the longitudinal direction, and wherein the reinforcing fibers are guided so that the turning angle is substantially equal to or greater than one-half of the cone angle.

The invention further comprises the joint formed by the connecting piece and the composite material product, as well as the connecting piece itself. In this regard, a connecting piece in accordance with the invention comprises a body having a substantially conical portion and a shoulder portion.

Several remarkable advantages are obtained by the method of the invention and the joint formed thereby, as well as by the connecting piece of the invention. In accordance with the invention, reinforcing fibers in the joint region comprise unitary, continuous fibers so that the joint is able to withstand high tensile strains in a reliable manner. The alignment of the reinforcing fibers in accordance with the invention provides a self-tightening joint between the product and the connecting piece so that the joint will not become loose during use. The joint produced in accordance with the invention is substantially corrosion resistant and may be provided with tensioning in the radial direction. A connecting piece in accordance with the invention as well as the paths of the reinforcing fibers comprise substantially smooth forms thereby reducing the possibility of fiber breakage under strain. Still further, a joint in accordance with the invention does not materially increase the diameter of the product since the joint so formed will only be slightly larger than the outer diameter of the product itself.

DESCRIPTION OF THE DRAWINGS

The invention will now be described in detail with reference to preferred embodiments shown in the drawings to which the invention is not to be confined, and wherein.

DESCRIPTION OF THE PREFERRED EMBODIMENTS

Figure 1:
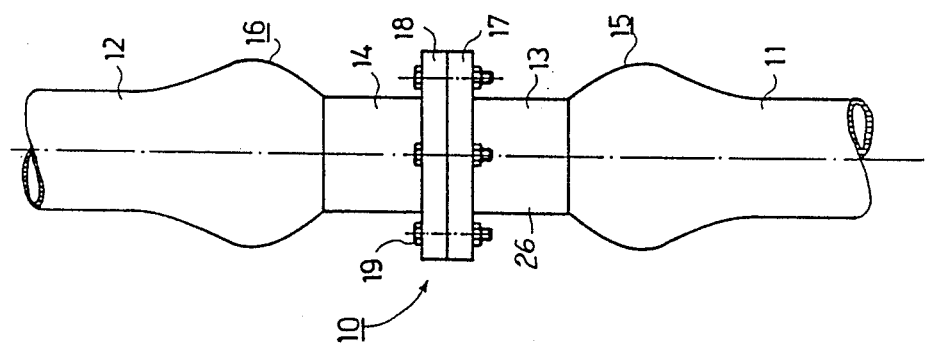
FIG. 1 is an axonometric view of two products formed of composite material connected to each other by a connection between joints formed in accordance with the invention.

Referring now to the drawings wherein like reference characters designate identical or corresponding parts throughout the several views, and more particularly to FIG. 1, a product formed of composite material in the form of a pipe 11 is joined to a connecting piece 13 at a joint 15 and, likewise, a pipe 12 formed of composite material is joined to a connecting piece 14 at a joint 16. The connecting pieces 13 and 14 include respective end flanges 17 and 18 which are connected by means of fastening members 19 to form a unit 10.

Figure 3:
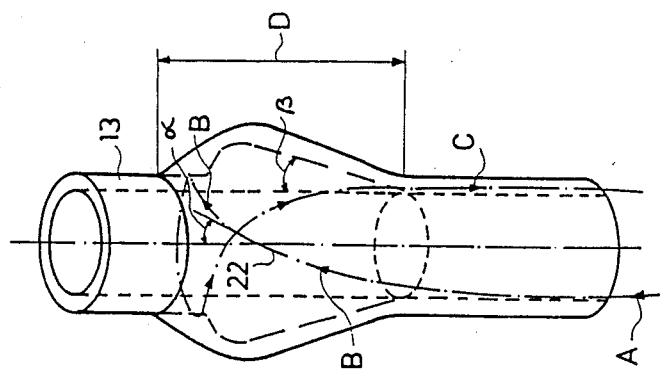
FIG. 3 is a schematic view of a joint formed in accordance with the invention illustrating the paths of a single fiber within the joint region of the connecting piece.
Figure 2:
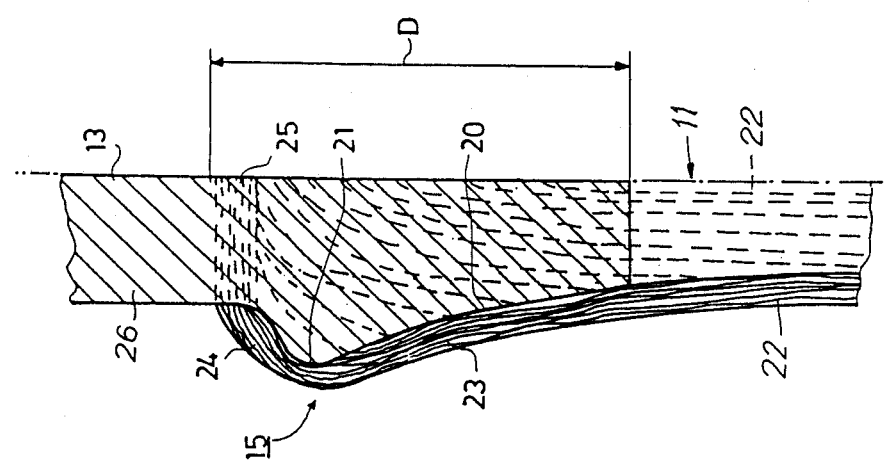
FIG. 2 is a fragmentary schematic section view of a joint between a product formed of composite material and a connecting piece in accordance with the invention.

Reference will now be made to FIGS. 2 and 3 which illustrate the method of manufacture and construction of the joint 15 formed between the pipe 11 of composite material and the connecting piece 13. The pipe 11 is made of a composite material which as noted above comprises reinforcing fibers 22 in a matrix of binding material. The connecting piece 13 in the illustrated embodiment comprises a substantially frusto-conical portion 20 which tapers inwardly from a shoulder 21. The region of the connecting piece at which the joint with the pipe 11 is formed comprises the conical portion 20 and the shoulder 21 and is designated D in FIGS. 2 and 3. A cylindrical portion 26 extends upwardly from the conical portion 20 to the end of which (not shown) flange 17 is associated.

In accordance with the invention, simultaneous with the formation of the pipe 11, the reinforcing fibers 22 which extend in the longitudinal direction A within pipe 11 are guided in a first direction B through a first path within the joint region D of connecting piece 13 to turn around the shoulder 21 of connecting piece 13 and then in a second direction C substantially opposite to the first direction B through a second path within the joint region D of connecting piece 13 to return to the composite material of the pipe 11. In this manner, both the pipe 11 of composite material and the joint 15 between the pipe 11 and the connecting piece 13 are simultaneously formed. Each reinforcing fiber 22 which passes around the shoulder 21 intersects itself at least one time within the joint region D, i.e., the first and second paths intersect, so that the joint 15 formed between the pipe 11 and the connecting piece 13 is substantially self-tightening. The reinforcing fiber 22 may turn around the shoulder 21 of connecting piece 13 once or several times before being guided in the opposite direction C.

The reinforcing fibers 22 of the composite material of pipe 11 preferably extend continously between the ends of pipe 11 in an uninterrupted fashion so that the same fibers 22 may be used to form joints with respective connecting pieces at each end of pipe 11. It is therefore possible, for example, to manufacture the embodiment shown in FIG. 1 provided with joints 15 and 16.

The connecting piece 13 preferably comprises a conical portion 20 provided with a shoulder 21 as illustrated in FIG. 2. The portions of the reinforcing fibers 22 extending over the conical portion of joint region D are designated 23. Similarly, the portions of the reinforcing fibers 22 which turn around the shoulder 21 are designated 24. The portions of reinforcing fibers 22 extending substantially perpendicularly to the longitudinal axis of pipe 11 are designated 25. Thus, the path of the reinforcing fibers 22 defined by portions 23, 24 and 25, forms a self-tightening joint 15 between the pipe 11 and the connecting piece 13.

The path of the reinforcing fibers 22 in the joint region D of the conical portion 20 of connecting piece 13 is preferably chosen such that the path in direction B of the reinforcing fibers 22 defines an angle $\alpha$ with the longitudinal direction whose magnitude is substantially equal to or greater than one-half the angle $\beta$ of the cone angle of the conical portion 20 of connecting piece 13 at the same point. In the latter case, moreover, tightening in the radial direction is also achieved in the area of conical portion 20.

It will be understood that the invention is by no means limited with respect to the shape or type of the product 11 of composite material. The product 11 may be a pipe as described herein, or may have any other configuration, such as a rod, a rectangular product, or any other configuration. Likewise, the invention is not limited with respect to the material of which the connecting piece 13 is formed. For example, the connecting piece 13 may be formed of steel, plastic, composite material, wood, or any other material at all.

Obviously, numerous modifications and variations of the present invention are possible in the light in the above teachings. It is therefore to be understood that within the scope of the claims appended hereto, the invention may be practiced otherwise than as specifically disclosed herein.

What is claimed is:

1. A method of forming a joint between a connecting piece and a product formed of composite material including a binding material matrix and reinforcing fibers extending through the matrix in a longitudinal direction, comprising the steps of:

forming said connecting piece with a shoulder within a joint region thereof, placing said connecting piece in a location at which said product is being formed, forming said product, and during formation of said product, guiding said longitudinally extending reinforcing fibers of said composite material as continuous, unitary fibers in a first direction in a first path within said joint region of said connecting piece towards said shoulder thereof, to turn around said shoulder of said connecting piece, and then in a second direction substantially opposite to said first direction in a second path within said joint region of said connecting piece to return to said composite material of said product, guiding at least some of said reinforcing fibers so that each crosses over itself at least once in said joint region, which includes said shoulder, of said connecting piece, whereby said joint formed between said connecting piece and said product comprises a self-tightening joint, and whereby both said product of said composite material and said joint between said product and said connecting piece are formed simultaneously.

2. The method of claim 1 wherein said step of guiding said reinforcing fibers includes guiding said reinforcing fibers to turn around said shoulder of said connecting piece at least one time.

3. The method of claim 1 wherein said product includes first and second ends and wherein said connecting piece forming step comprises forming a pair of said connecting pieces, and wherein said reinforcing fiber guiding step comprises forming a pair of joints between said first and second connecting pieces and said first and second products ends respectively.

4. The method of claim 3 wherein said reinforcing fibers guided to form said pair of joints comprise unitary, continuous fibers.

5. The method of claim 1 wherein said connecting piece has a substantially conical portion defining a cone angle and wherein said first path of said reinforcing fibers defines a turning angle with respect to said longitudinal direction, and wherein said guiding step comprises guiding said reinforcing fibers so that said turning angle is substantially at least equal to one-half of said cone angle.

6. An integrated assembly including a product formed of composite material and a connecting piece joined thereto, comprising:
   a connecting piece having a shoulder within a joint region thereof; and
   a product formed of composite material including a binding material matrix and reinforcing fibers extending through the matrix in a longitudinal direction substantially throughout said product, said reinforcing fibers extending in a first direction over a first path within said joint region of said connecting piece, said reinforcing fibers turning around said shoulder of said connecting piece at least one time, and said reinforcing fibers then extending in a second direction substantially opposite to said first direction over a second path within said joint region of said connecting piece to return to said composite material of said product, and
   further comprising at least some reinforcing fibers guided to each cross over itself at least once in said joint region, which includes said shoulder, of said connecting piece,
   whereby said joint formed between said connecting piece and said product comprises a self-tightening joint.

7. An assembly in accordance with claim 6 wherein said first and second paths of each of said reinforcing fibers intersect each other at least one time in said joint region of said connecting piece.

8. An assembly in accordance with claim 6 wherein said joint region of said connecting piece comprises a substantially conical portion of said connecting piece, said shoulder being formed at a larger base region of said conical portion.

* * * * *